June 4, 1935.  W. F. OLIVER  2,003,972
BRAKING SYSTEM
Filed Feb. 14, 1930   2 Sheets-Sheet 1
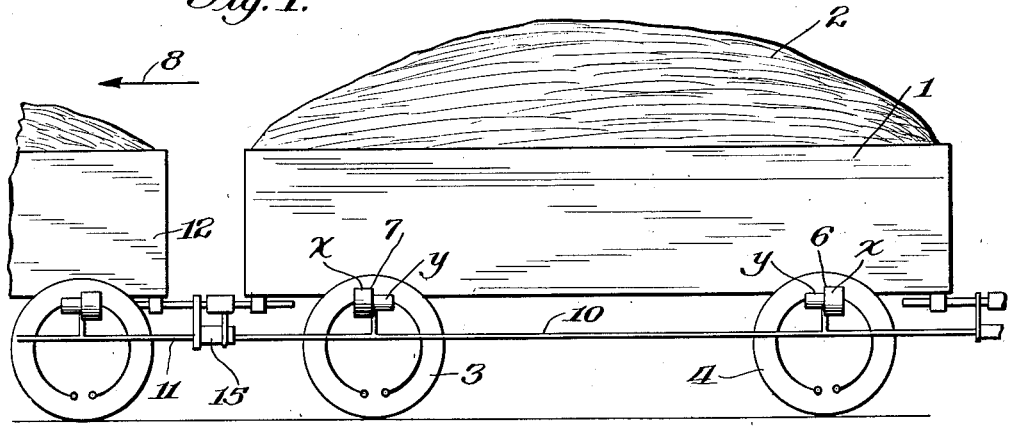
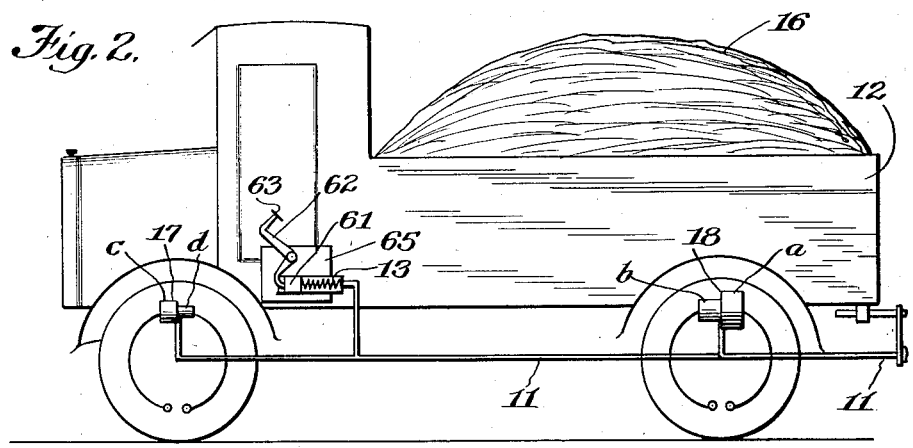
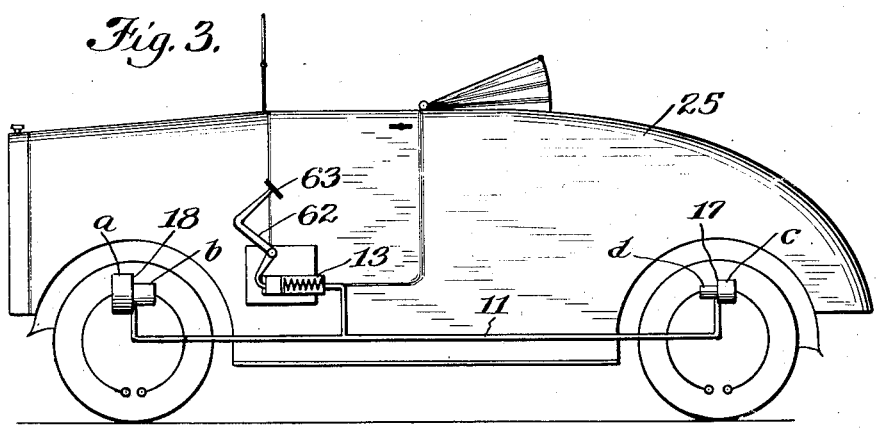
Inventor
Wallace F. Oliver
By Williams, Bradbury, McCaleb & Hinkle
Attys.

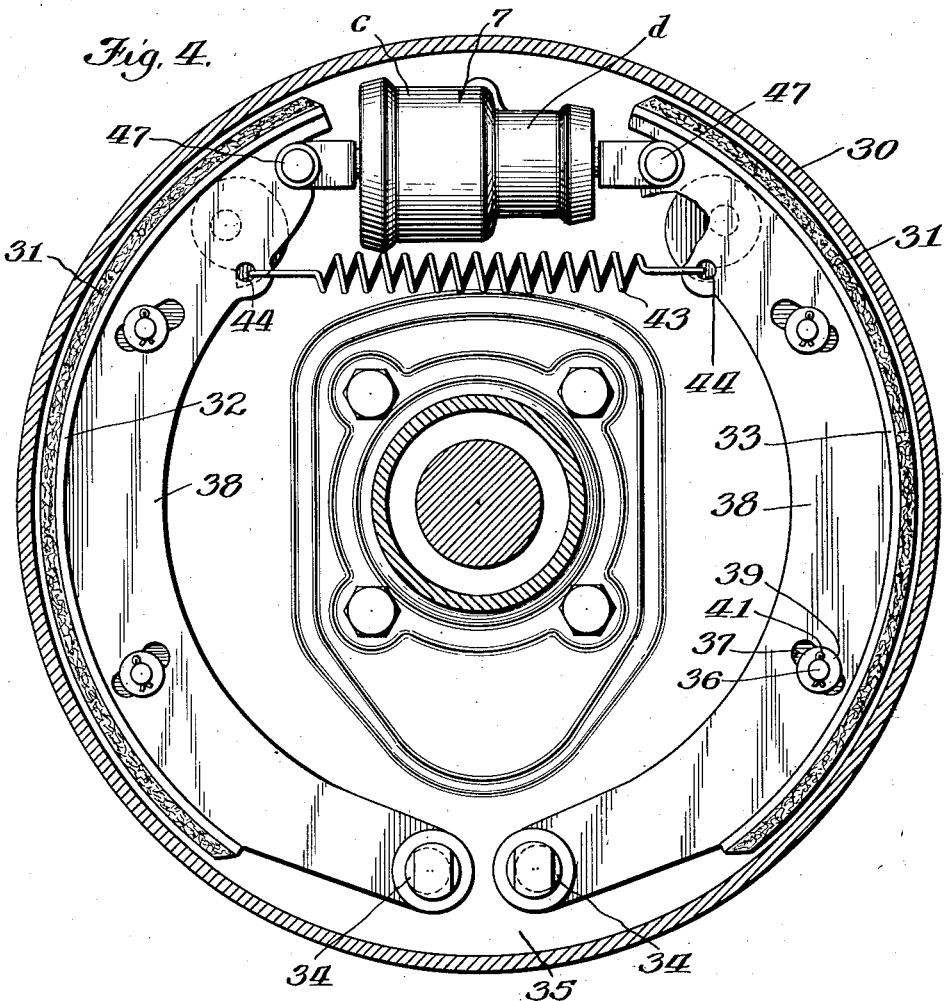

Patented June 4, 1935

2,003,972

UNITED STATES PATENT OFFICE 2,003,972

BRAKING SYSTEM

Wallace F. Oliver, Detroit, Mich., assignor to Hydraulic Brake Company, Los Angeles, Calif., a corporation of California Application February 14, 1930, Serial No. 428,348

12 Claims. (Cl. 188—10)

This invention relates to a braking system and more particularly to a system of the type specially adapted for use on motor vehicles.

An object of this invention is the provision of a braking system so designed that the wheels which carry the greater proportion of the load also exert a greater proportion of the braking torque, whether or not the vehicle is moving forward.

Another object is the provision of a braking system adapted to automatically apply the greater proportion of a total given braking torque to the leading wheels of the vehicle when the vehicle is being decelerated by the action of the brakes.

Other objects and advantages will become apparent from the following specification.

In the accompanying drawings,

Figure 1 is a diagrammatic illustration of a trailer incorporating my invention and designed to be loaded so that weight is equally distributed over the wheels and adapted to be drawn in either direction;

Figure 2 is a diagrammatic illustration of a truck designed especially for loading on the rear end and incorporating my invention;

Figure 3 is a diagrammatic representation of a high powered roadster which normally has greater weight on the front wheels than on the rear;

Figure 4 is a vertical section taken through a brake drum and looking in the direction of the shoes and their supporting pan;

Figure 5 is an enlarged vertical section taken through the brake cylinder shown in the upper part of Figure 4.

Heretofore considerable difficulty has been encountered in designing a brake system which would apply the brakes in a manner such that the braking torque exerted on each wheel would be in proportion to the effective load carried by the respective wheels whether the vehicle is moving forward or backward. Assuming, for instance, that a trailer 1 of the type shown in Figure 1 is supporting a load 2, the weight of which is uniformly distributed on the front wheels 3 and the rear wheels 4. When the vehicle is moving at substantially constant speed on the level, disregarding windage friction, the load will be carried equally by all four wheels. Upon application of the brakes the vehicle begins to decelerate and the effective weight of the load is shifted such that the front wheels 3 may take in a given instance 60% of the load and the rear wheels only 40%. If the vehicle is moving backward, the reverse is true and in all cases the leading wheels, which for purposes of this specification means the wheels, whether front or rear, which first pass over the ground over which the vehicle is moving, support about 60% of the load and the other wheels 40%.

Braking systems heretofore designed have been operable to exert a greater braking torque to stop forward movement of the vehicle than to stop backward movement of the vehicle, but this is not altogether satisfactory even though the speed of the vehicle may be considerably greater moving forward, as the deceleration and the necessary braking torque required to produce it may be the same regardless of the direction or speed of movement of the vehicle.

This invention provides for a total braking torque which is the same regardless of the direction of movement of the vehicle and which is proportioned among the wheels in such a way that the leading wheels carrying the greatest effective weight upon deceleration also exert the greatest braking torque.

The total energy available for the purpose of applying manually operable brakes is limited to a relatively definite amount. Considering the average force which the ordinary driver exerts and the distance of movement of the brake pedal which can be conveniently employed, this energy can be calculated. The total energy may be resolved into pounds pressure and fluid displacement in a hydraulic system of the type I have illustrated. The amount of pressure having been determined, the total area may be readily calculated from the displacement. Although the total area of the faces of all the pistons for applying the brakes on one front wheel and one rear wheel may vary somewhat, I have assumed an area equal to six units of area, which unit may be a square inch or larger or smaller as desired.

It has been determined from experiment that when using brake shoes of the type shown in Figure 4, the forward shoe is substantially four times as efficient as the reverse shoe when the vehicle is moving in a forward direction. Using this experimental fact as a basis, the relative areas of the pistons for use in each end $x$ and $y$ of cylinders 6 and 7 may be calculated as follows: Assuming the vehicle to be moving in the direction of the arrow 8, we have $$4x+y:x+4y::60:40$$

or solving for the relative values of $$x \text{ and } y$$

we get $$x=2y.$$

The sizes of the pistons therefore to be used in a vehicle which is normally loaded such that the load is equally distributed and the weight of which normally shifts in the proportion above stated to exert 60% on the leading wheels and 40% on the trailing wheels are such that the piston in the end $y$ of the cylinders has an area of 1 unit and the piston in the end $x$ has an area of 2 units.

In Figure 1 the cylinders 6 and 7 are adapted to receive fluid under pressure through the conduit 10 which is coupled with a conduit 11 on a motor vehicle 12 which may be similar to the motor vehicle shown in Figure 2 and having a master cylinder 13 and a conduit 14 through which the fluid under pressure is forced to the conduit 10 coupled on the rear end. The coupling device 15 may be of any usual design and for purposes of illustration I have shown one similar to that described in the patent to Malcolm Loughead, No. 1,507,390, issued September 2, 1924.

When my invention is employed on the vehicle 12 shown in Figure 2 which carries a load 16 mainly over the rear wheels, it is necessary to vary the sizes of the cylinders 17 and 18 such that the torque produced on the rear wheels will be in proportion to the load normally carried thereby and still adapted to operate so that when the truck 12 is moving backward the greater torque is applied on the rear wheels and when moving forward an equal or greater torque is applied on the front wheels.

In this case it has been assumed that the weight of the truck and load is distributed when the vehicle is standing still, 60% on the rear wheels and 40% on the front wheels. When the vehicle is moving forward and is being decelerated by means of application of the brakes, the effective weight on the front wheels is 50% and on the rear wheels 50%. When the same vehicle is moving backward and being decelerated, the effective weight on the rear wheels is 70% and on the front wheels 30%. It will, of course, be understood that these assumptions are based on average conditions and it will also be understood that the deceleration referred to in this specification will be a maximum deceleration allowable without slippage of the wheels. Taking these assumptions as a basis we proceed to calculate the sizes of the pistons necessary to be used in portions $c\ d$ of cylinder 17 and $a\ b$ of cylinder 18 in the following manner:

When the vehicle is standing still the relative forces on the brake shoes is represented by the following proportion $$a+b:d+c::3:2$$

When the vehicle is moving backward and being decelerated by action of the brakes, we have the following proportion $$4a+b:4d+c::7:3$$

since the reverse shoe of retracting mechanism is substantially four times as efficient as the forward shoe. When the vehicle is moving forward, we have the proportion $$a+4b:d+4c::1:1$$

since in moving in this direction the reverse shoe on each braking mechanism is four times as effective as the forward shoes in proportion to the amount of force they receive.

Again assuming the total piston area to be 6 units, then we have the equation $$a+b=-d-c+6$$

Resolving the above three proportions into equations we have:

(1) $2a+2b=3d+3c$ (2) $12a+3b=28d+7c$ (3) $a+4b=d+4c$ (4) $a+b=-d-c+6$ (the equation first above stated)

Solving the above four equations by any well known algebraic method we determine the values of $a$, $b$, $d$ and $c$ to be in terms of units of area as follows:

$$a=2.3$$
$$b=1.3$$
$$c=1.7$$
$$d=.7$$

As has been above pointed out the unit of area may be 1 square inch more or less as found to be most suitable. By using the areas above determined, the braking effect on the front and rear wheels will be 50% on the front wheels and 50% on the rear wheels when being decelerated from forward movement and 30% on the front wheels and 70% on the rear wheels when being decelerated from backward movement. Of course, the amount of loading will vary and the grades over which the vehicle travels will vary and the braking effect produced by employing my invention will provide for average conditions and of course will be the same whether or not the load is removed from the truck, but when there is no load in the truck the necessity of powerful and properly proportioned brakes is of lesser importance.

In the modification shown in Figure 3 the vehicle 25 is of the type of a high powered racer which has a greater weight over the front wheels than over the rear wheels, which weight is distributed in the proportion of approximately 60% on the front wheels and 40% on the rear wheels.

It will be noted that in this case the relation is exactly opposite to that shown in Figure 2 and it is only necessary to place the larger cylinder 18 on the brake mechanisms operating on the front wheels and the smaller cylinder 17 on the brake mechanisms operating on the rear wheels which respectively have end portions $c$ and $d$, also $a$ and $b$ which will be proportioned of such size to accommodate cylinders having the exact proportions as stated for $a$ and $b$, and $c$ and $d$ above determined, although the unit of area used may be modified to suit the weight of the vehicle.

Referring to Figures 4 and 5, I have shown the detail construction of the various brake mechanisms which are all substantially alike except in some cases the cylinder may be reversed, depending on whether they are used on the front wheels or the rear wheels. For the purpose of illustration I have shown the cylinder 7 having ends $c$ and $d$, which accommodate pistons 28 and 29 respectively having oppositely disposed faces the areas of which are of the ratio of about 2 to 1. The brake drum 30 is of any usual construction and is provided with cooperating brake shoes having brake linings 31 thereon. The forward brake shoe 32 and the reverse brake shoe 33 are pivoted on bolts 34 which have eccentric portions secured into the supporting pan 35 for providing necessary adjustment of the lower ends of the shoes to compensate for wear on the brake linings. For the purpose of guiding the brake shoes throughout the range of movement, I provide pins 36 which pass through elongated apertures 37 in the ribs 38. The ribs are held in position on the pin 36 by means of washers 39 and cotter keys 41.

For the purpose of retracting the shoes from engagement with the drum to prevent dragging of the brakes when force of application is removed I provide a coil spring 43 the ends of which pass through apertures 44 adjacent the upper ends of the ribs 38.

The detail construction of the cylinder 7 is best shown in Figure 5. The pistons 28 and 29 are provided with piston rods 45, the outer ends 46 of which have pins 47 therethrough which engage the ribs 38 adjacent their upper ends for forcibly pressing outwardly thereon and applying the brakes when liquid under pressure is admitted to the cavity 49 between the faces of the pistons ~~28~~ and 29. Suitable cups 51 and 52 are seated on the faces of pistons 29 and 28 for preventing the leakage of fluid past the same. A suitable coil spring 55 disposed within the cylinder 7 has its opposite ends in contact with the caps 51 and 52 for holding them onto the faces of the pistons. An intake port 57 is provided through the cylinder wall through which it is adapted to receive fluid under pressure from the conduit 10, which in turn receives fluid from the conduit 11 connected to the outlet end of a master cylinder 13 having a piston 61 therein adapted to be actuated by the bell crank lever 62 forming a part of the foot pedal 63 and adapted to be depressed by the operator of the vehicle.

The details of construction of the master cylinder 13 and the fluid reservoir 65 is not a part of this invention and any suitable form shown in the prior art may be used.

From the foregoing description it will be readily appreciated that I have devised a braking system adapted to produce a predetermined total braking torque when the vehicle is moving forward and the same braking torque when the vehicle is moving rearward, and in which the brake mechanisms are so arranged and designed that the braking torque on the front wheels is always greater when the vehicle is moving forward than when it is moving backward, also in which the braking torque on the rear wheels is greater when the vehicle is moving backward than when it is moving forward. This arrangement provides for the effective shift of weight from the rear wheels to the front wheels or vice versa as the case may be, when the vehicle is being decelerated.

It will be understood by those skilled in the art that other modifications than those shown in the drawings may be devised whereby my invention may be carried out and I desire to avail myself of such modifications as come within the scope of the appended claims.

I claim as my invention:

1. In a braking system for a vehicle having front and rear wheels, a brake mechanism operable on a front wheel and a brake mechanism operable on a rear wheel, and means for expending energy to operate both of said mechanisms, said mechanisms including means for utilizing a greater proportion of the energy expended in the leading wheel of the vehicle in either direction of its motion.

2. The combination of a vehicle having front and rear wheels, with a braking system comprising a pair of brake mechanisms operable to exert a braking torque on the front wheels and a pair of brake mechanisms operable to exert a braking torque on the rear wheels, said mechanisms comprising brake drums, cooperating friction members, and actuating devices therefor, said actuating devices including means, controlled by the direction of movement of the vehicle to compensate for the effective shift of weight due to deceleration in either direction, operative to effect a greater proportion of the total braking torque by the pair of mechanisms on the leading end of the vehicle.

3. In a brake system for vehicles the combination of front and rear brake shoes, a brake drum, and cylinders and pistons for each of said shoes with each of the wheels of said vehicle, and a source of hydraulic fluid under pressure, the cylinders and pistons for the front and rear shoes being of different diameters, the large pistons actuating the brake shoes on the leading wheels of the vehicle having the wrapping action.

4. In a brake system for vehicles the combination of front and rear brake shoes, a brake drum, and cylinders and pistons for each of said shoes with each of the wheels of said vehicle, a source of fluid under pressure, the diameters of said pistons and cylinders being proportioned relative to the increase in weight applied to the leading wheels under deceleration in either direction.

5. In a hydraulic braking system for a vehicle having front and rear wheels, a braking mechanism on each of said wheels comprising a brake drum, a front and rear brake shoe and a multi-bore cylinder having cooperating pistons for pressing each of said shoes against said drums, and a source of fluid under pressure, the larger of said pistons cooperating with the forward and rear brake shoes of the brake mechanisms of the leading and trailing wheels of the vehicle respectively to effect the same braking torque by the utilization of a given amount of pressure regardless of the direction of motion of the vehicle.

6. In a hydraulic braking system for a vehicle having front and rear wheels, a braking mechanism on each of said wheels comprising a brake drum, a front and rear brake shoe and a multi-bore cylinder having cooperating pistons for pressing each of said shoes against said drums, and a source of fluid under pressure, the diameters of said cylinder and pistons being proportioned to compensate for the effective shift of weight due to deceleration of the vehicle in either direction.

7. In a hydraulic braking system for a vehicle having front and rear wheels, a braking mechanism on each of said wheels comprising a brake drum, a front and rear brake shoe and a multi-bore cylinder having cooperating pistons for pressing each of said shoes against said drums, and a source of fluid under pressure, the larger of said pistons of each of said brake mechanisms being adapted to actuate the brake shoes on the leading wheels of the vehicle having the wrapping action to compensate for the effective shift of weight of the vehicle on the wheels due to deceleration in either direction.

8. In a vehicle having front and rear wheels, the combination of brake drums rotatable with said wheels, brake shoes associated with each drum for movement into braking engagement therewith, one of the shoes associated with each drum being a forward shoe which is most efficient when the vehicle is moving in a forward direction and one of the shoes associated with each drum being a reverse shoe which is most efficient when the vehicle is moving in a rearward direction, mechanism for applying greater pressure to the forward shoe than to the reverse shoe associated with a front wheel drum, mechanism for applying greater pressure to the reverse shoe than to the forward shoe associated with a rear wheel drum, and means for operating said mechanisms.

9. In a vehicle having front and rear wheels, the combination of brake drums rotatable with said wheels, brake shoes associated with each drum for movement into braking engagement therewith, one of the shoes associated with each drum being a forward shoe which is most efficient when the vehicle is moving in a forward direction and one of the shoes associated with each drum being a reverse shoe which is most efficient when the vehicle is moving in a rearward direction, hydraulic mechanism for applying greater pressure to the forward shoe than to the reverse shoe associated with a front wheel drum, hydraulic mechanism for applying greater pressure to the reverse shoe than to the forward shoe associated with a rear wheel drum, and means for operating said mechanisms.

10. In a vehicle having front and rear wheels, the combination of brake drums rotatable with said wheels, brake shoes associated with each drum for movement into braking engagement therewith, one of the shoes associated with each drum being a forward shoe which is most efficient when the vehicle is moving in a forward direction and one of the shoes associated with each drum being a reverse shoe which is most efficient when the vehicle is moving in a rearward direction, mechanism for applying greater pressure to the forward shoe than to the reverse shoe associated with a front wheel drum, mechanism for applying greater pressure to the reverse shoe than to the forward shoe associated with a rear wheel drum, one of said mechanisms exerting greater total pressure than is exerted by the other mechanism, and means for operating said mechanisms.

11. In a vehicle having front and rear wheels, the combination of brake drums rotatable with said wheels, brake shoes associated with each drum for movement into braking engagement therewith, one of the shoes associated with each drum being a forward shoe which is most efficient when the vehicle is moving in a forward direction and one of the shoes associated with each drum being a reverse shoe which is most efficient when the vehicle is moving in a rearward direction, mechanism for applying greater pressure to the forward shoe than to the reverse shoe associated with a front wheel drum, mechanism for applying greater pressure to the reverse shoe than to the forward shoe associated with a rear wheel drum, the mechanism associated with a front wheel exerting greater total pressure than is exerted by the mechanism associated with a rear wheel, and means for operating said mechanisms.

12. In a vehicle having front and rear wheels, the combination of brake drums rotatable with said wheels, brake shoes associated with each drum for movement into braking engagement therewith, one of the shoes associated with each drum being a forward shoe which is most efficient when the vehicle is moving in a forward direction and one of the shoes associated with each drum being a reverse shoe which is most efficient when the vehicle is moving in a rearward direction, mechanism for applying greater pressure to the forward shoe than to the reverse shoe associated with a front wheel drum, mechanism for applying greater pressure to the reverse shoe than to the forward shoe associated with a rear wheel drum, the mechanism associated with a rear wheel exerting greater total pressure than is exerted by the mechanism associated with a front wheel, and means for operating said mechanisms.

WALLACE F. OLIVER.